United States Patent [19]

Verachtert

[11] Patent Number: 4,490,246
[45] Date of Patent: Dec. 25, 1984

[54] PROCESS FOR SWEETENING PETROLEUM FRACTIONS

[75] Inventor: Thomas A. Verachtert, Wheeling, Ill.

[73] Assignee: UOP Inc., Des Plaines, Ill.

[21] Appl. No.: 553,344

[22] Filed: Nov. 18, 1983

[51] Int. Cl.³ .................... C10G 19/02; C10G 19/08
[52] U.S. Cl. ............................... 208/206; 208/193; 208/203
[58] Field of Search ............... 208/193, 201, 203, 206

[56] References Cited

U.S. PATENT DOCUMENTS

| | | | |
|---|---|---|---|
| 2,988,500 | 6/1961 | Gleim et al. | 208/206 |
| 3,408,287 | 10/1968 | Urban et al. | 208/207 |
| 3,565,959 | 2/1971 | Takase et al. | 208/206 |
| 4,019,869 | 4/1977 | Morris | 208/206 |
| 4,412,913 | 11/1983 | Moote et al. | 208/207 |

OTHER PUBLICATIONS

Hydrocarbon Processing, Apr. 1982, p. 124, "Merox".

Primary Examiner—Delbert E. Gantz
Assistant Examiner—O. Chaudhuri
Attorney, Agent, or Firm—William H. Page, II; John F. Spears, Jr.

[57] ABSTRACT

A process is disclosed for treating hydrocarbon streams by the catalyzed oxidation of mercaptans to disulfides. In the process, the hydrocarbon-containing stream is admixed with air and then passed through an oxidation zone. The oxidation zone effluent is decanted to remove an aqueous alkaline solution in a high pressure separation zone. It is then depressurized into a low pressure separator in which dissolved excess nitrogen and oxygen are substantially removed from the hydrocarbons. The treated hydrocarbons are then pressurized to force their flow into a low pressure product receiving facility. This sequence eliminates or minimizes the discharge of gaseous nitrogen and oxygen and hydrocarbon vapors in the storage facility, where they are pollution abatement problems and possible safety hazards.

16 Claims, 1 Drawing Figure

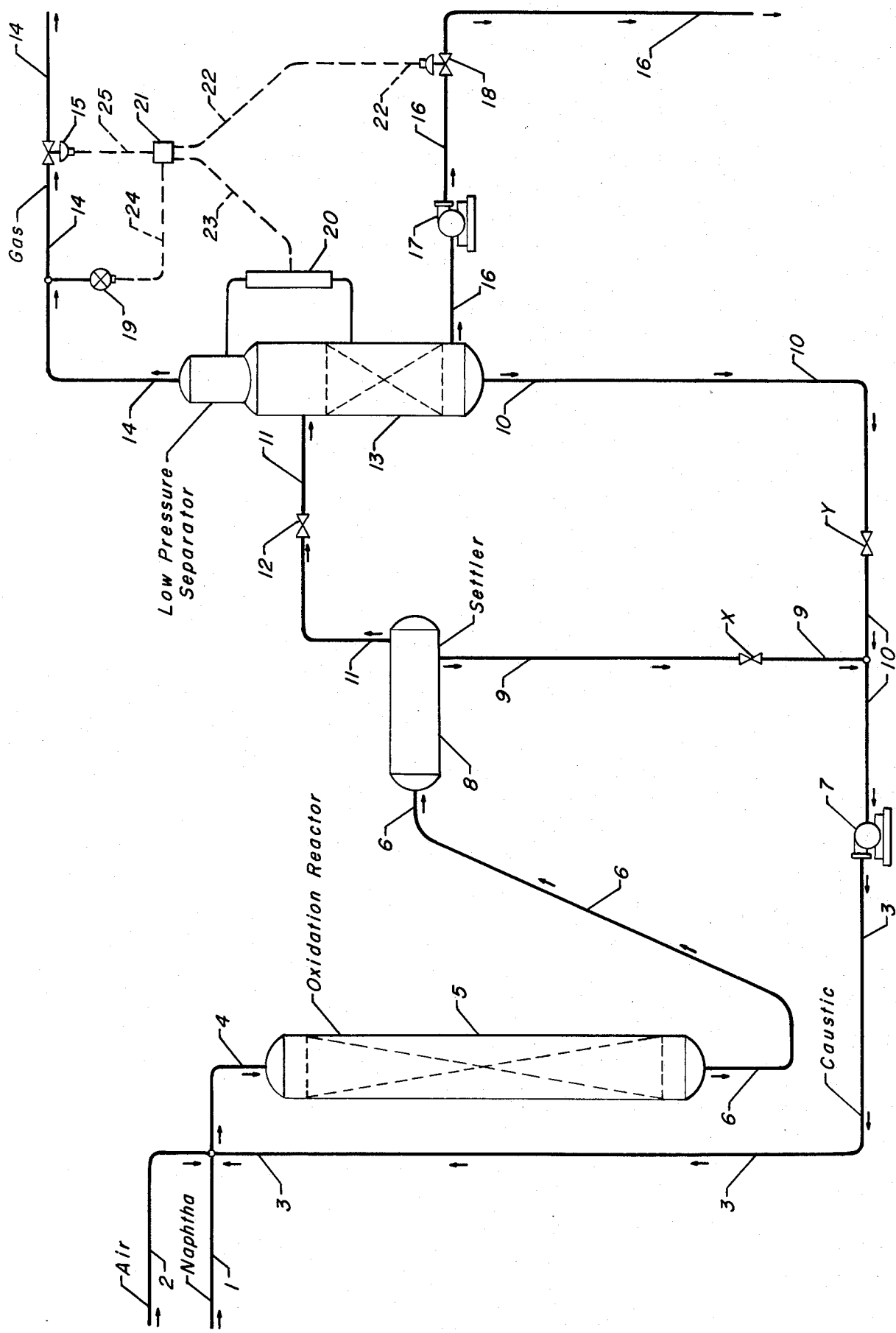

PROCESS FOR SWEETENING PETROLEUM FRACTIONS

FIELD OF THE INVENTION

The invention relates to a process for treating various petroleum fractions. The invention more specifically relates to a process for treating sulfur-containing petroleum fractions such as naphthas or kerosenes. The invention directly concerns the catalyzed oxidation of mercaptans present in the petroleum fractions into disulfide compounds which are retained in the petroleum fraction. This treating process is commonly referred to as sweetening.

PRIOR ART

The sweetening of sour petroleum fractions in well developed commercial processes is employed in almost all petroleum refineries. In these commercial scale processes, the mercaptans present in the feed hydrocarbon stream are converted to disulfide compounds which remain in the hydrocarbon stream. Sweetening processes therefore do not remove sulfur from the hydrocarbon feed stream but convert it to an acceptable form. The sweetening process involves the admixture of an oxygen supply stream, typically air, into the hydrocarbon stream and the use of a mercaptan oxidation catalyst. The oxidation catalyst may be part of a solid support or may be dispersed or dissolved in an aqueous alkaline solution. A commonly employed mercaptan oxidation catalyst is a metal phthalocyanine compound.

The oxygen consumed in the oxidation of the mercaptans is normally atmospheric oxygen supplied by admixing air into the hydrocarbon feed stream. Since excess oxygen is usually supplied and since air contains a large percentage of inert nitrogen, a sizable mercaptan concentration in the feed stream results in an amount of gas remaining after the sweetening reaction that exceeds the solubility limits of the remaining gases in the hydrocarbon at storage pressure. Sufficient pressure is maintained in the treating process to maintain a single phase and assure that the residual gases remain in solution. However, commercial practice has been to route the product hydrocarbons and dissolved gases to a storage facility at atmospheric pressure. The gases therein separate from the sweetened hydrocarbons due to the lower pressure.

An alternative procedure, shown in the literature, is to separate "excess air" from the liquid hydrocarbons in a vessel downstream of the oxidation zone. This vessel also serves to separate hydrocarbon and aqueous phases. This mode of operation is shown in U.S. Pat. Nos. 2,988,500 (Gleim et al.) and 3,408,287 (Urban et al.). These references are also pertinent for their general description of mercaptan oxidation catalysts, process flows and oxidation zone operating conditions including pressures from atmospheric to 1000 psig or more.

These references represent older processing techniques as evidenced by their dates, their range of oxygen supply, up to 200 vol.% of the feed hydrocarbon, and their downflow operation of the reaction. In this older processing mode, the amount of air admixed into the hydrocarbons could greatly exceed the amount which is soluble in hydrocarbons. True two-phase flow resulted and the "excess air" removed in these processes was in some instances mainly gaseous material exiting the reactor. In this extent, these references are distinguishable from the operation of the subject process, which has all of the air dissolved into the feed hydrocarbons. Modern sweetening processes are exemplified by the flows shown at page 124 of the April 1982 issue of *Hydrocarbon Processing* and in U.S. Pat. No. 4,019,869.

BRIEF SUMMARY OF THE INVENTION

The invention provides an improved process for sweetening sour hydrocarbon fractions which greatly reduces safety hazards and emissions problems otherwise encountered at low pressure (atmospheric pressure) storage facilities for the treated hydrocarbons. The subject process delivers to storage a product stream having a low concentration of dissolved gases thereby reducing gas evolution at the storage facility. One broad embodiment of the subject process may be characterized as a process for treating hydrocarbons which comprises admixing air into a hydrocarbon feed stream which comprises mercaptans and contacting the hydrocarbon feed stream in the presence of an alkaline aqueous solution with a mercaptan oxidation catalyst in an oxidation zone maintained at oxidation-promoting conditions which include an elevated pressure above about 120 psia, and forming a liquid phase oxidation zone effluent stream which comprises hydrocarbons, disulfide compounds and alkaline aqueous solution with oxygen and nitrogen being dissolved in the hydrocarbons; separating the oxidation zone effluent stream in a high pressure separation zone maintained at essentially the same pressure as the oxidation zone into a liquid phase first process stream which comprises hydrocarbons having disulfide compounds, oxygen and nitrogen dissolved therein and an aqueous stream comprising the alkaline solution; withdrawing the aqueous stream from the high pressure separation zone; passing the first process stream into a low pressure separation zone, which is operated at a substantially lower pressure than the high pressure separation zone, and forming a vapor stream comprising oxygen, nitrogen and hydrocarbons and also forming a second process stream which comprises hydrocarbons having disulfide compounds dissolved therein; and passing the second process stream into a low pressure storage facility. In a more limited embodiment of the process, the first process stream also contains some of the alkaline solution which is separated from the treated hydrocarbons to form a second aqueous stream. The first aqueous stream can be recycled to the oxidation zone.

DESCRIPTION OF THE DRAWING

The drawing is a schematic illustration of a sweetening process in which a naphtha stream carried by line 1 is sweetened by the conversion of mercaptan compounds to disulfides. This illustration of one specific embodiment of the invention is not intended to preclude from the scope of the subject invention those other embodiments set out herein or reasonable and expected modifications to those embodiments. The drawing has been simplified by the deletion of a large number of apparatus customarily employed on a process of this nature, such as vessel internals, temperature and pressure control systems, flow control valves, recycle pumps, etc., which are not specifically required to illustrate the performance of the subject process.

Referring now to the drawing, the sour naphtha feed stream from line 1 is admixed with air from line 2 and a recycle stream of an aqueous alkaline solution referred to as caustic carried by line 3. The pressure at this point causes the air to become dissolved in the naphtha. The resultant liquid phase admixture is transferred ino the oxidation reactor 5 through line 4. This mixture is then passed downward across the packed bed of contacting material under oxidation conditions which promote the oxidation of the mercaptans originally present in the naphtha feed stream to disulfide compounds. There is thereby formed a liquid phase oxidation zone effluent stream carried by the line 6 which comprises a highly dispersed admixture of liquid phase hydrocarbons and liquid phase caustic. This stream also contains dissolved oxygen and nitrogen derived from the air stream and which were added in quantities in excess of the solubility limits at the operating temperature and atmospheric pressure.

The quiescent conditions maintained within the high pressure settler 8 result in a separation of the bulk of the denser aqueous caustic from the less dense liquid phase hydrocarbons to thereby form an aqueous recycle stream removed from the settler through line 9. The remaining liquid phase materials and substantially all of the dissolved gases are removed in line 11 as the first process stream of the subject invention. As the first process stream passes through valve 12, it is significantly depressurized. The first process stream then passes into the low pressure separator 13, wherein the evolved vapor phase material is separated into a vapor stream removed through line 14. A bed of coalescing material is preferably provided in the lower portion of the low pressure separator to concentrate entrained caustic into a separate aqueous phase. Periodically, valve y is opened and a stream of this material is withdrawn through line 10, pressurized in the pump 7 and recycled to the oxidation zone. Caustic may be added and withdrawn from the process through a line not shown to maintain both the strength and quantity of caustic within the desired limits.

A substantial portion of the internal volume of low pressure separator 13 is filled with liquid hydrocarbons having an upper level monitored by the level detection means 20. This control means transmits a signal through means 23 to a controller 21 which in turn generates a signal transmitted through means 22 to the flow control valve 18. A product stream of the treated hydrocarbon is withdrawn from the low pressure separator through line 16 and pressurized by a pump 17 before being transmitted to a low pressure storage facility at a rate controlled by the valve 18. The pressure of the vapor stream flowing through line 14 is monitored by the pressure measurement means 19 which generates a signal transmitted through the means 24 to the control means 21. The control means 21 transmits a signal to the flow control valve 15 through the means 25, with this signal normally adjusting the valve 15 to maintain a constant pressure within the low pressure separator. However, if the level detecting means 20 indicates a high liquid level within the separator 13, then the controller 21 transmits a signal which closes valve 15 thereby stopping the flow of the vapor stream through line 14. This prevents the discharge of the treated liquid hydrocarbons to the gas treating and hydrocarbon recovery facilities.

DETAILED DESCRIPTION

Most normally liquid hydrocarbon fractions produced in a petroleum refinery contain some sulfur compounds unless the hydrocarbon fraction has been subject to very extensive desulfurization procedures. The sulfur concentration in these fractions may be relatively low due to upstream refining operations such as hydrotreating. In many instances, such low total sulfur concentrations are acceptable in products such as motor fuel naphtha, kerosene or diesel fuel. However, the concentration of certain sulfur compounds must be very low to meet product specifications for these products. Specifically, the concentration of acidic and malodorous mercaptan compounds must be very low. The total removal of all sulfur-containing compounds can be very expensive. Therefore, it is a common practice to convert small amounts of mercaptan compounds to disulfide compounds, which because of their low vapor pressure and nonacid nature, are tolerable in the hydrocarbon product, rather than to attempt to totally remove all sulfur compounds. This treating process is referred to as sweetening as it converts a "sour" smelling feedstock into a "sweet" smelling product, sometimes referred to as a "Doctor sweet" product owing to the "doctored" product passing a simple qualitative test indicating the absence of mercaptan compounds.

Sweetening is widely employed commercially as a low cost method of lowering the mercaptan content of normally liquid hydrocarbon products. In a typical commercial sweetening unit, the feed hydrocarbon is admixed with a gaseous oxygen supply stream and passed through a catalytic oxidation zone in which the mercaptans are oxidized to the corresponding disulfides. Air is normally employed as the oxygen supply stream due to the greater cost of more highly concentrated oxygen-containing gases. An excess of oxygen above that required for the stoichiometric oxidation of the mercaptans is added to the hydrocarbon stream to promote the oxidation reaction. This results in a large amount of nitrogen also being admixed into the hydrocarbon feed stream. The solubility of nitrogen in hydrocarbon feedstocks is only about one-half that of oxygen. The result is that the added gases often exceed the amount of gas which can be dissolved in the hydrocarbons at storage tank pressures of less than about 5–10 psig. The use of mixed (vapor-liquid) phase streams in the oxidation zone is not desired as it leads to channeling of the hydrocarbon flow and inefficient or poor operation. The feed stream and oxidation zone are therefore maintained at a sufficient pressure to ensure liquid phase operations. As not all of the oxygen, and none of the nitrogen, is consumed in the oxidation zone, the oxidation zone effluent therefore contains liquid phase hydrocarbons and a mixture of dissolved gaseous oxygen and nitrogen. The effluent of the oxidation zone will also contain disulfide compounds and some of the aqueous alkaline solution used in the process.

Although the previously cited older references indicate that undissolved gases or "excess air" can be separated from the oxidation zone effluent stream in a vessel downstream of the oxidation zone, a now prevalent commercial practice is to separate only the alkaline solution from the effluent stream at the pressure of the oxidation zone and to pass the hydrocarbons directly to the storage facility used to retain the sweetened product. If the mercaptan concentration of the feedstock is substantial, the liquid phase hydrocarbons will contain considerable amounts of dissolved gases. These gases separate from the liquid hydrocarbons at the low pressure maintained within the storage facility. The gases are vented to the atmosphere or processed through the vapor handling equipment if the hydrocarbon storage facility is so equipped. This practice has several disadvantages. First, it can lead to potentially dangerous situations if the hydrocarbons which vaporize into the gas phase form an explosive mixture. This dangerous situation is compounded by the tendency of the hydrocarbon-gas admixture to acquire a substantial static electrical charge during its considerable travel through the piping which carries it from the treating process to the storage facilities. Secondly, this operational method can lead to hydrocarbon emissions of a quantity no longer acceptable due to pollution regulations. Further, these hydrocarbon emissions result in the loss of valuable product. Finally, it is preferred that a hydrocarbon-air mixture such as this is vented near a furnace or fired heater in the refinery where it can be used as fuel rather than at a quite distance tank farm.

It is therefore desirable to reduce or eliminate the passage of dissolved gases to the storage facilities in the product hydrocarbons. A one-stage separation system such as that suggested in the previously cited references would achieve this if it is operated at substantially the same pressure as the storage facility. As the storage facility is preferably operated at a very low pressure, atmospheric pressure is highly preferred, the separation system would have to also be operated at a very low pressure. However, it is often desired to operate the oxidation zone at an elevated pressure to increase the solubility of oxygen and nitrogen in the hydrocarbons. It is also desired to minimize the pressure difference between the oxidation zone and the liquid-liquid settler in which the alkaline solution is recovered for recycling to the oxidation zone. Any significant pressure difference increases the cost of recycling the alkaline solution. In addition, depressurizing the oxidation zone effluent through a control valve will admix the hydrocarbons and aqueous material. This is undesirable as they are to be separated in a gravity settler. It is an objective of the subject invention to eliminate or reduce the conflicts imposed by these operational preferences. It is also an objective of the subject invention to provide an improved process for sweetening normally liquid hydrocarbons.

In the subject process, the effluent of the oxidation zone is subjected to a first separation step in a high pressure or primary separation zone maintained at essentially the same elevated pressure as employed in the oxidation zone. The pressure in the primary separation zone is therefore less than that in the oxidation zone only by the inherent pressure drop of the interconnecting conduits, which is normally less than about 15–20 psig. The primary separation zone is therefore normally operated at a pressure above about 100 psig. At least the majority if not all of the aqueous alkaline solution used in the process is separated from the remainder of the oxidation zone effluent stream in the primary separation zone. The high pressure separation zone may comprise a separate vessel such as the horizontal settler shown in the drawing. This is preferred with high caustic circulation rates and/or difficult hydrocarbon-caustic separations. If only a moderate or small amount of caustic is passed into the oxidation zone, the primary separation zone may be located in the bottom of the same vessel that contains the oxidation zone.

The hydrocarbons withdrawn from the primary separation zone are depressurized through a flow control means into a low pressure separation zone. This releases the bulk of the gases dissolved in the liquid hydrocarbons. The freed gases are collected into a vapor phase stream which is withdrawn from the low pressure separation zone as the off-gas stream of the process. These gases are those that would be vented into the product storage tank under the previously described contemporary commercial methods. The vapor phase stream vented from the low pressure separator will also contain an equilibrium concentration of whatever hydrocarbons are being processed. A liquid phase stream of the treated hydrocarbons is also withdrawn from the low pressure separation zone and is passed into the product storage tank. Preferably, both the low pressure separation zone and the product storage facility are operated at a pressure below about 5 psig.

At least 99 volume percent of the alkaline solution employed in the process is preferably separated from the oxidation zone effluent stream in the primary separation zone to form an aqueous stream for recycling. However, in some applications of the subject process, the hydrocarbonaceous first process stream will also contain some of the alkaline solution. This aqueous liquid can be separated from the liquid phase hydrocarbons and returned to the oxidation zone as part of the recycled aqueous material. In some applications of the process, it can be discarded. This separation of residual aqueous material can be promoted through the use of a bed of coalescing material suspended within the low pressure separation zone. The use of the coalescing media is beneficial since most of the aqueous liquid entering the low pressure separation zone will be in the form of small droplets suspended in the liquid hydrocarbon phase. The alkaline solution obtained from the low pressure separation zone is therefore derived from the aqueous liquid which was not separated by the bulk decantation performed in the primary separation zone.

The low pressure separation zone is preferably a vertical cylindrical vessel shaped much as shown in the drawing. The vessel is preferably operated with a very high liquid level. This decreases the amount of oxygen-containing vapor present in the vessel and also increases the residence time of the liquids. An increased residence time also aids in the separation of entrained aqueous liquid from the hydrocarbons. The upper section of the vessel preferably has a smaller diameter to decrease its volume, with at least a major portion of the small diameter upper portion of the vessel being packed with a material such as 1-inch steel Raschig rings for both mist elimination and anti-detonation protection functions. The liquid level (liquid-vapor interface) may be located at the base of the small diameter upper portion of the vessel. A liquid level detecting means, which preferably comprises two separate level controllers at different elevations, is used to monitor the liquid level in the vessel. This liquid level is used to regulate the rate of hydrocarbon withdrawal. It is also used in an override control mode which stops the flow of the gas stream, which is normally controlled on the basis of the pressure in the vessel, as a safety measure when the liquid level exceeds a predetermined upper limit. This upper limit may be about the vertical midpoint of the upper portion of the vessel.

A limited embodiment of the subject invention may be characterized as a process for treating hydrocarbons which comprises the steps of passing air, a liquid aqueous alkaline solution and a feed stream which comprises mercaptans and a hydrocarbon mixture having a boiling point range below about 550° F. into an oxidation zone maintained at oxidation-promoting conditions including a pressure above about 150 psig and thereby forming a liquid phase oxidation zone effluent stream which comprises liquid phase hydrocarbons having oxygen and nitrogen dissolved therein, disulfide compounds, and the aqueous alkaline solution; passing the oxidation zone effluent stream into a high pressure separation zone operated at substantially the same pressure as the oxidation zone and wherein liquid aqueous alkaline solution is separated by decantation and thereby forming a first aqueous stream comprising the aqueous alkaline solution and also forming a liquid phase first process stream comprising liquid hydrocarbons and disulfide compounds, with oxygen and nitrogen being dissolved in the liquid hydrocarbons of the first process stream; passing the first process stream into a low pressure separation zone operated at a pressure substantially below that of the primary separation zone and preferably below about 5 psig wherein dissolved gases are released from the liquid hydrocarbons, and withdrawing from the low pressure separation zone a vapor stream comprising oxygen, nitrogen, and hydrocarbon, a second process stream comprising liquid hydrocarbons and a second aqueous stream comprising the aqueous alkaline solution; and passing the second process stream into a low pressure storage facility. The subject process can be applied to the sweetening of any of the various hydrocarbon fractions previously set out including naphtha and kerosene. Light straight run or coker naphthas are specific examples of the preferred feed materials, which contain a mixture of hydrocarbons having boiling points under about 430° F. The feed stream may be derived from coal, petroleum, oil shale, etc.

A mercaptan oxidation catalyst is preferably employed in the subject process. This catalyst may be supported on a bed of inert solids retained within the oxidation zone or may be dispersed or dissolved in the aqueous alkaline solution. The catalyst may also be present in both a supported and a dissolved form. Any commercially suitable mercaptan oxidation catalyst can be employed. For instance, U.S. Pat. No. 3,923,645 describes a catalyst comprising a metal compound of tetrapyridinoporphyrazine which is preferably retained on an inert granular support. The preferred catalyst is a metallic phthalocyanine such as described in the previously cited references and in U.S. Pat. Nos. 2,853,432, 3,445,380, 3,574,093, and 4,098,681. The metal of the metallic phthalocyanine may be titanium, zinc, iron, manganese, etc. but is preferably either cobalt or vanadium, with cobalt being especially preferred. The metal phthalocyanine is preferably employed as a derivative compound. The commercially available sulfonated compounds such as cobalt phthalocyanine monosulfonate or cobalt phthalocyanine disulfonate are preferred, although other mono-, di-, tri-, and tetrasulfo derivatives could be employed. Other derivatives including carboxylated derivatives, as prepared by the action of trichloroacetic acid on the metal phthalocyanine, can also be used if desired in the subject process.

When the catalyst is used in its supported form, an inert absorbent carrier material is employed. This material may be in the form of tablets, extrudates, spheres, or randomly shaped naturally occurring pieces. Natural materials such as clays and silicates or refractory inorganic oxides may be used as the support material. The support may therefore be formed from diatomaceous earth, kieselguhr, kaolin, alumina, zirconia, etc. It is especially preferred that the catalyst comprises a carbon-containing support, particularly charcoals which have been thermally and/or chemically treated to yield a highly porous structure similar to activated carbon. The active catalytic material may be added to the support in any suitable manner, as by impregnation by dipping, followed by drying. The catalyst may also be formed in-situ within the oxidation zone as described in the cited references. The finished catalyst preferably contains from about 0.1 to about 10 wt.% of a metal phthalocyanine.

In the preferred form of the sweetening process, an aqueous alkaline solution is admixed with the sour feed stream and air and the admixture is then passed through a fixed bed of the oxidation catalyst. The preferred alkaline reagent comprises a solution of an alkaline metal hydroxide such as sodium hydroxide, commonly referred to as caustic, or potassium hydroxide. Sodium hydroxide may be used in concentrations of from about 1 to 40 wt.%, with a preferred concentration range being from about 1 to about 25 wt.%. Any other suitable alkaline material may be employed if desired. The rate of oxygen addition is set based on the mercaptan content of the sour feed hydrocarbon stream. The rate of oxygen addition is preferably greater than the amount required to oxidize all of the mercaptans contained in the feed stream, with oxygen feed rates of about 110 to about 220% of the stoichiometrically required amount being preferred.

The use of a packed bed contacting zone is preferred in all variations of the subject process to provide quiescent admixture of the reactants for a definite residence time. Perforated plates, channeled mixers, inert packing, or fibers can also be used in other variations of the subject process to provide turbulent admixture. Contact times in the oxidation zone are generally chosen to be equivalent to a liquid hourly space velocity based on hydrocarbon charge of about 1 to 70 or more. The sweetening process is generally performed at ambient (atmospheric) or slightly elevated temperatures. A temperature above about 50° F. and below about 300° F. is preferred. The pressure in the contacting zone is not critical but is generally elevated to the extent necessary to prevent vaporization of the hydrocarbons and to achieve the solution of added oxygen and nitrogen into the hydrocarbons. The oxidation zone may be successfully operated at low pressures including atmospheric pressure. However, the subject process is directed to hydrocarbons having significant mercaptan contents and which therefore require substantially elevated pressures to achieve the desired gas solubility. For this reason, an elevated pressure above 150 psig is preferred. Higher pressures up to 1000 psig or more can be employed, but increase the cost of the process and are not preferred unless required to promote liquid phase conditions.

I claim as my invention:

1. A process for treating hydrocarbons which comprises:
   (a) admixing air into a hydrocarbon feed stream which comprises mercaptans and contacting the hydrocarbon feed stream with an alkaline aqueous solution and a mercaptan oxidation catalyst in an oxidation zone maintained at oxidation-promoting conditions which include an elevated pressure above about 120 psig, and forming a liquid phase oxidation zone effluent stream which comprises hydrocarbons, disulfide compounds and an alkaline aqueous solution with oxygen and nitrogen being dissolved in the hydrocarbons;

(b) separating the oxidation zone effluent stream in a high pressure separation zone separate and remote from said oxidation zone and which is maintained at essentially the same pressure of above about 120 psig as the oxidation zone into a liquid phase first process stream which comprises hydrocarbons having disulfide compounds, oxygen and nitrogen dissolved therein and an aqueous stream comprising the alkaline solution;

(c) withdrawing the aqueous stream from the high pressure separation zone;

(d) passing the first process stream into a low pressure separation zone operated at a pressure below about 5 psig, to form a vapor stream comprising oxygen, nitrogen and vaporous hydrocarbons and a liquid phase second process stream which comprises liquid hydrocarbons having disulfide compounds dissolved therein; and, (e) passing the second process stream into a low pressure storage facility.

2. The process of claim 1 further characterized in that the hydrocarbon feed stream has a boiling point range below about 430° F.

3. The process of claim 2 further characterized in that said storage facility is operated at a pressure below about 5 psig.

4. The process of claim 3 further characterized in that at least a portion of the aqueous stream is recycled to the oxidation zone.

5. The process of claim 4 further characterized in that the mercaptan oxidation catalyst comprises a metal phthalocyanine.

6. A process for treating hydrocarbons which comprises the steps of:

(a) passing air, a liquid aqueous alkaline solution and a feed stream which comprises mercaptans and a hydrocarbon mixture having a boiling point range below about 550° F. into an oxidation zone maintained at oxidation-promoting conditions including a pressure above about 150 psig and thereby forming a liquid phase oxidation zone effluent stream which comprises liquid phase hydrocarbons having oxygen and nitrogen dissolved therein, disulfide compounds, and the aqueous alkaline solution;

(b) passing the oxidation zone effluent stream into a high pressure separation zone separate and remote from said oxidation zone and operated at substantially the same pressure as the oxidation zone of above about 150 psig and wherein liquid aqueous alkaline solution is separated by decantation to form a first aqueous stream comprising the aqueous alkaline solution and a liquid phase first process stream comprising liquid hydrocarbons and disulfide compounds, with oxygen and nitrogen being dissolved in the liquid hydrocarbons of the first process stream;

(c) passing the first process stream into a low pressure separation zone operated at a pressure below about 5 psig wherein dissolved gases are released from the liquid hydrocarbons, and withdrawing from the low pressure separation zone a vapor stream comprising oxygen, nitrogen and vaporous hydrocarbon, a liquid phase second process stream comprising liquid hydrocarbons and a second aqueous stream comprising the aqueous alkaline solution; and, (d) passing the second process stream into a low pressure storage facility.

7. The process of claim 6 further characterized in that at least a portion of the first aqueous stream is recycled to the oxidation zone.

8. The process of claim 6 further characterized in that the first process stream is passed through a coalescing medium within the low pressure separator and in that the second aqueous stream is therein separated from the entering liquid hydrocarbons by decantation.

9. The process of claim 8 further characterized in that the first aqueous stream and the second aqueous stream are withdrawn from the process.

10. The process of claim 6 further characterized in that the oxidation zone contains a fixed bed of an oxidation catalyst.

11. The process of claim 10 further characterized in that the oxidation catalyst comprises a metal phthalocyanine.

12. The process of claim 11 further characterized in that the hydrocarbons of the feed stream are a mixture of hydrocarbons having a boiling point range below about 430° F.

13. The process of claim 6 further characterized in that said aqueous alkaline solution contains a mercaptan oxidation catalyst.

14. The process of claim 13 further characterized in that the hydrocarbons of the feed stream are a mixture of hydrocarbons having a boiling point range below about 430° F.

15. The process of claim 14 further characterized in that the hydrocarbons of the feed stream are a mixture of hydrocarbons having a boiling point range below about 250° F.

16. The process of claim 13 further characterized in that said storage facility is maintained at a pressure below about 5 psig.

* * * * *